United States Patent

Ikeno et al.

Patent Number: 5,292,848
Date of Patent: Mar. 8, 1994

[54] FLUOROSILICONE COMPOSITION AND ITS GELLIKE CURED PRODUCT

[75] Inventors: Masayuki Ikeno; Miyuki Tanaka; Hiroyasu Hara, all of Annaka; Hironao Fujiki, Takasaki; Shinichi Sato; Hiroshi Inomata, both of Annaka, all of Japan

[73] Assignee: Shin-Etsu Chemical Co., Ltd., Tokyo, Japan

[21] Appl. No.: 964,946

[22] Filed: Oct. 22, 1992

[30] Foreign Application Priority Data

Oct. 22, 1991 [JP] Japan .................................. 3-302284

[51] Int. Cl.$^5$ .............................................. C08G 77/06
[52] U.S. Cl. .......................................... 528/15; 528/36
[58] Field of Search ..................................... 528/15, 36

[56] References Cited

FOREIGN PATENT DOCUMENTS 0208239  1/1987  European Pat. Off. .
0279706  8/1988  European Pat. Off. .
0488709  6/1992  European Pat. Off. .

*Primary Examiner*—Melvyn T. Marquis
*Attorney, Agent, or Firm*—Oblon, Spivak, McClelland, Maier & Neustadt

[57] ABSTRACT

The present fluorosilicone composition is an addition reaction curable composition that uses, as an alkenyl group-containing organopolysiloxane, a fluorine-containing organopolysiloxane represented by the following general formula (1):

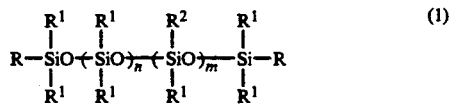

wherein R represents a vinyl group, $R^1$ represents an alkyl group or a phenyl group, $R^2$ represents a group represented by the following formula (2):

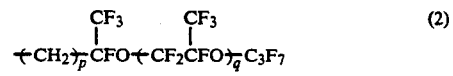

in which p is an integer of 2 to 8 and q is an integer of 1 to 10, and n and m are each a positive integer. This composition can form a gellike cured product particularly excellent in acid resistance.

7 Claims, No Drawings

FLUOROSILICONE COMPOSITION AND ITS GELLIKE CURED PRODUCT

BACKGROUND OF THE INVENTION

1. Field of the Invention

The present invention relates to an addition reaction curable fluorosilicone composition and a gellike cured product that is obtained therefrom and is excellent in chemical resistance.

2. Description of the Prior Art

It is known that since addition curable fluorosilicone compositions using as a base polymer an organopolysiloxane with 3,3,3-trifluoropropyl groups can form a gellike cured product excellent in properties such as gasoline resistance and oil resistance, they are useful for parts for aircraft.

However, the above fluorosilicone compositions are still unsatisfactory in chemical resistance such as acid resistance and further improvement is required.

SUMMARY OF THE INVENTION

Therefore, an object of the present invention is to provide an addition curable fluorosilicone composition capable of forming a gel cured product remarkably improved in chemical resistance such as acid resistance.

According to the present invention, there is provided a fluorosilicone composition, comprising:

(A) an alkenyl group-containing organopolysiloxane represented by the following general formula (1):

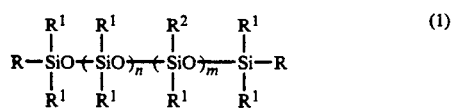

wherein R represents an alkenyl group, $R^1$'s, which may be the same or different, each represent an alkyl group having 1 to 8 carbon atoms or a phenyl group, $R^2$ represents a group represented by the following formula (2)

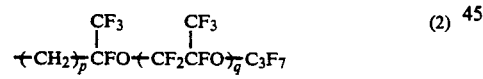

in which p is an integer of 2 to 8 and q is an integer of 1 to 10, and n and m are each a positive integer, (B) a hydrogensiloxane having silicon-bonded hydrogen atoms represented by the following general formula (3):

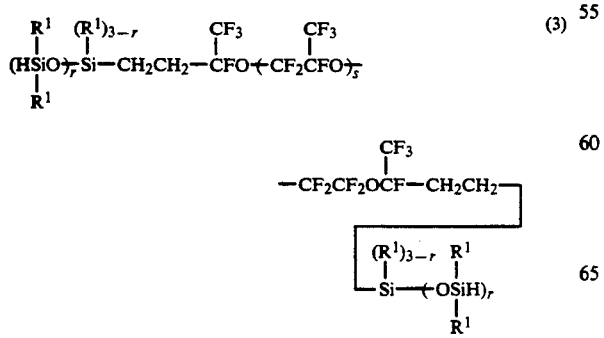

wherein $R^1$ has the same meaning as defined above, r is an integer of 2 or 3, and s is a positive integer, and (C) a platinum family metal catalyst.

According to the present invention, there is also provided a gellike cured product obtained by curing the above composition.

Herein, the term "gellike cured product" means a product which has partially a three-dimensional network, is deformed or fluidized when stressed, and has a penetration of 0 to 200 measured according to ASTM D-1403 (¼ Scale Cone).

DETAILED DESCRIPTION OF PREFERRED EMBODIMENTS

(A) Organopolysiloxanes

The component (A) of the present fluorosilicone composition is represented by the above general formula (1) and is a linear fluorine-containing organopolysiloxane with alkenyl groups at both ends of the chain of the molecule.

In the general formula (1), R represents an alkenyl group, which preferably has 2 to 8 carbon atoms and specific examples include a vinyl group, an allyl group, a 1-butenyl group, and a 1-hexenyl group.

$R^1$ is selected from the group consisting of an alkyl group having 1 to 8 carbon atoms such as a methyl group, an ethyl group, a butyl group, a hexyl group, a cyclohexyl group, and an octyl group, and a phenyl group.

The group $R^2$ represented by the above formula (2) has a structure wherein an oligomer of hexafluoropropylene oxide is bonded to an alkylene group and is quite important to improvement in chemical resistance of the gellike cured product. Preferable examples of $R^2$ include the following, which do not restrict the present invention.

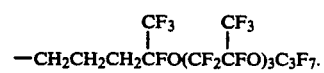

In the present invention, typical examples of the component (A) which is an alkenyl group-containing organopolysiloxane represented by the above-mentioned general group (1) include the following:

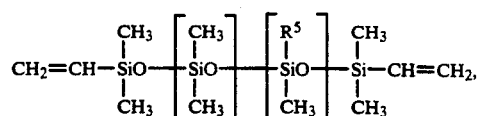

-continued

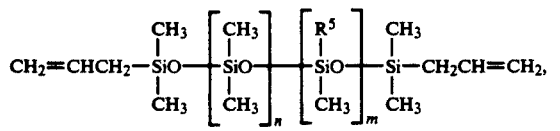

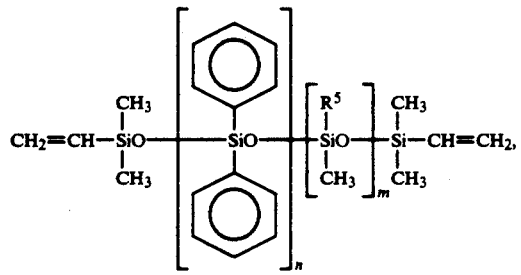

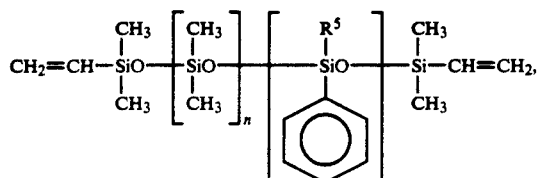

and

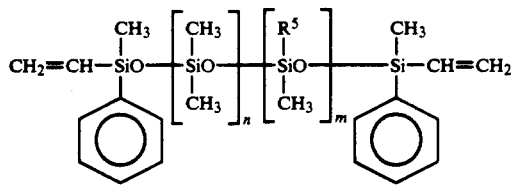

wherein $R^5$ represents a fluorine-containing group represented by the following formula (4):

in which q is an integer of 1 to 10, preferably 1 to 5, and n and m are each a positive integer, preferably a number such that m/(n+m) is 0.1 or more but less than 1.

This organopolysiloxane has preferably a viscosity at 25° C. in the range of 50 to 10,000 cP, particularly 100 to 1,000 cP, in order to give the composition a suitable fluidity before the curing and to give to the cured composition (gellike cured product) suitable adhesiveness and suitable physical properties.

The above-mentioned organopolysiloxane, the component (A), can be produced, for example, by a process disclosed in Japanese Pre-examination Patent Publication (kokai) No. 4-25563 (1992).

(B) Hydrogensiloxanes

The component (B) of the present fluorosilicone composition is represented by the above formula (3) and is a fluorine-containing organosiloxane having silicon-bonded hydrogen atoms at the ends of the molecule.

Examples of the hydrogensiloxane, the component (B), include the following compounds:

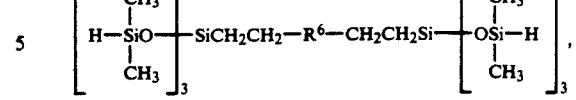

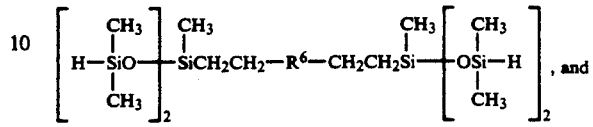

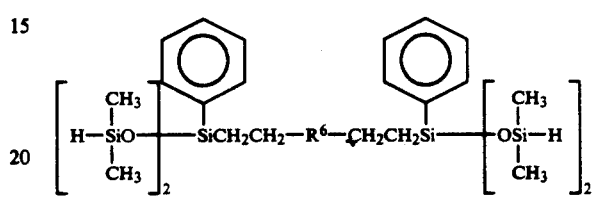

wherein $R^6$ represents a bivalent fluorine-containing group represented by the following formula:

in which s is a positive integer, preferably an integer of 1 to 10.

When the SiH groups in the hydrogensiloxane undergoes an addition reaction with the alkenyl groups in the component (A), a gellike cured product (silicone gel) is formed. For the formation of a silicone gel, it is preferable that the hydrogensiloxane is used in such an amount that the SiH groups thereof amount to 0.1 to 1 mol per mol of the alkenyl groups in the component (A).

This hydrogensiloxane can be produced, for example, by a process disclosed in Japanese Pre-examination Patent Publication (kokai) No. 3-251589 (1991).

(C) Platinum Family Metal Catalysts

The platinum family metal catalyst, the component (C) of the present fluorosilicone composition, is a known catalyst for subjecting the alkenyl groups in the component (A) and the silicon-bonded hydrogen atoms (SiH groups) in the component (B) to an addition reaction and serves as a curing accelerator.

Such a catalyst includes a platinum catalyst, a palladium catalyst, and a rhodium catalyst, and the platinum catalyst includes, for example, chloroplatinic acid, a solution of chloroplatinic acid modified with an alcohol, a coordination compound of chloroplatinic acid with an olefin or a vinyl siloxane, the palladium catalyst includes, for example, tetrakis(triphenylphosphine)palladium, and the rhodium catalyst includes, for example, chlorotris(triphenylphosphine)rhodium, with preference given to the platinum catalyst.

The amount of the platinum family metal catalyst, the component (C), to be used is generally in the range of 0.1 to 100 ppm in terms of the platinum family metal based on the total amount of the component (A) and the component (B).

Other Components

In the present fluorosilicone composition, besides the above components (A) to (C), various ingredients which are known per se can be added if necessary.

The hardness and mechanical strength of the gellike cured product obtainable from the present fluorosilicone composition can be adjusted by adding, for example, an inorganic filler such as fumed silica, silica aerosil, precipitated silica, ground silica, diatomaceous earth, iron oxide, zinc oxide, titanium oxide, calcium carbonate, magnesium carbonate, zinc carbonate, and carbon black. Indeed, a hollow inorganic filler, a hollow organic filler, an organosilicone resin or rubberlike spherical filler and the like can also be added. Further, a reaction retarding agent such as a polymethylvinylsiloxane cyclic compound, an acetylene compound, and an organophosphorus compound can be added to control the curing reaction. The amount of these ingredients to be added is arbitrary unless the properties of the gellike cured product are not impaired.

Formation of the Gellike Cured Product

By curing the present fluorosilicone composition comprising the above-mentioned components, a gellike cured product excellent in chemical resistance can be formed.

The formation of a gellike cured product is carried out in a conventional known manner, for example, by pouring the present addition reaction curable fluorosilicone composition into a suitable mold, where the curing is effected, or coating the composition on a suitable substrate and then curing the composition. The curing can be effected easily by heat treatment generally at a temperature of 60° to 150° C. for about 30 to 80 min.

Uses

Because the gellike cured product of the present fluorosilicone composition is excellent in electrical insulating properties, stability in electrical properties, and flexibility, the gellike cured product is used as a material for encapsulating or potting electrical or electronic parts. Particularly, the gellike cured product is used in covering control circuit elements such as power transistors, IC, and condensers to protect them from thermal and mechanical failures.

Further, since the gellike cured product of the present fluorosilicone composition is particularly excellent in chemical resistance, where the gellike cured product is used for electrical or electric parts to be mounted on automobiles, these parts can be protected from gasoline, and $NO_x$, $SO_x$, etc. in exhaust gas.

EXAMPLES

The present invention will now be described with reference to the following Examples. In the following Examples and Comparative Example, the values of viscosities are all measured at 25° C.

Example 1

100 parts by weight of an organopolysiloxane (viscosity: 700 cP) represented by the following formula:

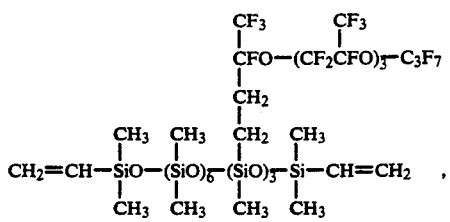

4 parts by weight of a hydrogensiloxane (viscosity: 15 cP) represented by the following formula:

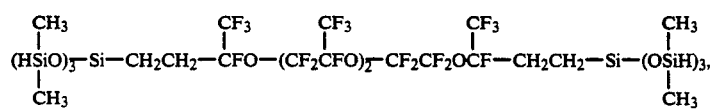

and 0.02 part by weight of a complex of tetramethyldivinyldisiloxane with chloroplatinic acid (Pt: 3 % by weight) were mixed uniformly to prepare Composition I.

Composition I was heated at 150° C. for 1 hour to obtain a transparent gellike cured product. The penetration of the cured produce was measured (ASTM D-1403; ¼ Scale Cone). The result is shown in Table 1.

Further, Composition I was applied to a square aluminum piece measuring 1 cm × 1 cm in a glass Petri dish to form a coating with a thickness of 1 mm and then the piece was immersed in a hydrochloric acid solution (pH: 1) at 50° C. to carry out an acid resistance test. The time required until the aluminum piece is eroded shown in Table 1.

Example 2

Example 1 was repeated, except that, in place of the organopolysiloxane used in Example 1, an organopolysiloxane (viscosity: 800 cP) represented by the following formula:

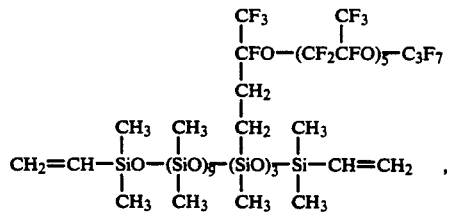

was used, thereby preparing Composition II.

With respect to Composition II, the measurement of the penetration and the acid resistance test were carried out in the same way as in Example 1. The results are shown in Table 1.

Comparative Example 1

100 parts by weight of an organopolysiloxane (viscosity: 700 cP) represented by the following formula:

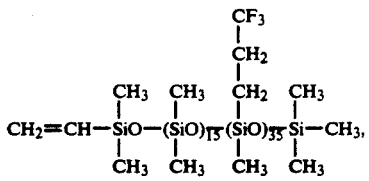

15 parts by weight of a hydrogensiloxane (viscosity: 130 cP) represented by the following formula:

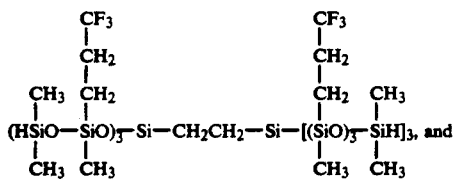

0.02 part by weight of a complex of tetramethyldivinyl-disiloxane with chloroplatinic acid (Pt: 3 % by weight) were mixed uniformly to prepare Composition III.

With respect to Composition III, similarly to Example I, the measurement of the penetration and the acid resistance test were carried out. The results are shown in Table 1.

TABLE 1

| | Example 1 | Example 2 | Comparative Example 1 |
|---|---|---|---|
| Penetration | 85 | 90 | 65 |
| Acid resistance | 600 hr. | 800 hr. | 300 hr. |

We claim:

1. A fluorosilicone composition, comprising:
(A) an alkenyl group-containing organopolysiloxane represented by the following general formula (1):

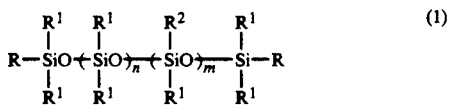

wherein R represents an alkenyl group, $R^1$'s, which may be the same or different, each represent an alkyl group having 1 to 8 carbon atoms or a phenyl group, $R^2$ represents a group represented by the following formula (2)

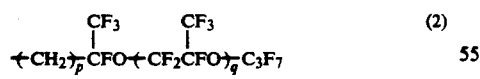

in which p is an integer of 2 to 8 and q is an integer of 1 to 10, and n and m are each a positive integer,
(B) a hydrogensiloxane having silicon-bonded hydrogen atoms represented by the following general formula (3):

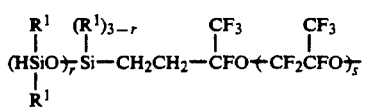

-continued

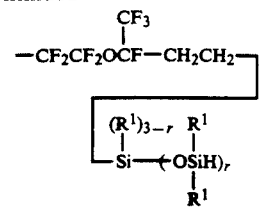

wherein $R^1$ has the same meaning as defined above, r is an integer of 2 or 3, and s is a positive integer, and (C) a platinum family metal catalyst.

2. A composition as claimed in claim 1, wherein said alkenyl group-containing organopolysiloxane (A) is an alkenyl group-containing organopolysiloxane of said general formula (1) wherein R represents a vinyl group and $R^1$ represents a methyl group or a phenyl group.

3. A composition as claimed in claim 1, wherein said alkenyl group-containing organopolysiloxane (A) is an alkenyl group-containing organopolysiloxane of said general formula (1) wherein n and m are positive integers such that m/(n+m) is 0.1 or more but less than 1.

4. A composition as claimed in claim 1, wherein said alkenyl group-containing organopolysiloxane (A) is an alkenyl group-containing organopolysiloxane wherein, in the general formula (1), $R^2$ is a group selected from the group consisting of

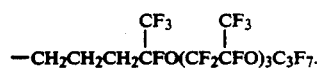

5. A composition as claimed in claim 1, wherein said hydrogensiloxane (B) is at least one compound selected from the group consisting of compounds represented by the following formulas

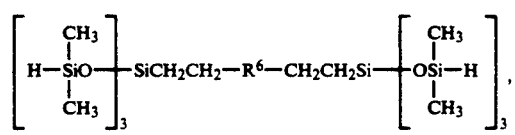

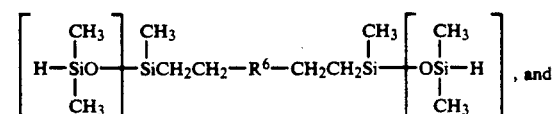

-continued

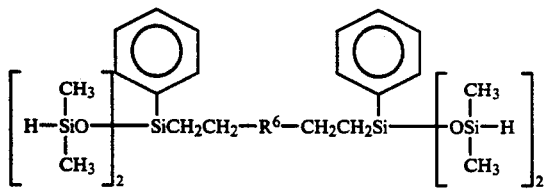

wherein R⁶ represents a bivalent fluorine-containing group represented by the following formula:

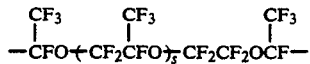

in which s is a positive integer.

6. A composition as claimed in claim 1, wherein said hydrogensiloxane (B) is present in such an amount that the SiH groups contained in said hydrogensiloxane (B) is 0.1 to 1 mol per mol of the alkenyl groups in said component (A).

7. A gellike cured product obtained by curing a composition as claimed in claim 1.

* * * * *